US009191646B2

(12) United States Patent
Rusanovskyy et al.

(10) Patent No.: US 9,191,646 B2
(45) Date of Patent: Nov. 17, 2015

(54) APPARATUS, A METHOD AND A COMPUTER PROGRAM FOR VIDEO CODING AND DECODING

(75) Inventors: Dmytro Rusanovskyy, Lempäälä (FI); Miska Matias Hannuksela, Ruutana (FI)

(73) Assignee: Nokia Technologies Oy, Espoo (FI)

( * ) Notice: Subject to any disclaimer, the term of this patent is extended or adjusted under 35 U.S.C. 154(b) by 349 days.

(21) Appl. No.: 13/597,245

(22) Filed: Aug. 28, 2012

(65) Prior Publication Data

US 2013/0222534 A1    Aug. 29, 2013

Related U.S. Application Data

(60) Provisional application No. 61/528,485, filed on Aug. 29, 2011.

(51) Int. Cl.
| | |
|---|---|
| *H04N 15/00* | (2006.01) |
| *H04N 13/00* | (2006.01) |
| *H04N 13/04* | (2006.01) |
| *H04N 13/02* | (2006.01) |
| *H04N 19/597* | (2014.01) |
| *H04N 19/463* | (2014.01) |

(52) U.S. Cl.
CPC ....... *H04N 13/0048* (2013.01); *H04N 13/0011* (2013.01); *H04N 13/0018* (2013.01); *H04N 13/025* (2013.01); *H04N 13/0271* (2013.01); *H04N 13/0402* (2013.01); *H04N 13/0459* (2013.01); *H04N 19/463* (2014.11); *H04N 19/597* (2014.11); *H04N 2013/0081* (2013.01); *H04N 2213/005* (2013.01)

(58) Field of Classification Search
CPC ................ H04N 13/0055; H04N 19/00769; H04N 13/0239; H04N 13/0404; H04N 13/0409
USPC ........................................................... 348/43
See application file for complete search history.

(56) References Cited

U.S. PATENT DOCUMENTS

| | | | |
|---|---|---|---|
| 6,868,191 B2 | 3/2005 | Nister | |
| 2010/0254627 A1 | 10/2010 | Panahpour Tehrani et al. | |
| 2011/0304708 A1* | 12/2011 | Ignatov | 348/51 |
| 2012/0008672 A1* | 1/2012 | Gaddy et al. | 375/240.01 |
| 2014/0192154 A1* | 7/2014 | Jeong et al. | 348/43 |

OTHER PUBLICATIONS

International Search Report and Written Opinion received for corresponding Patent Cooperation Treaty Application No. PCT/FI2012/050830, dated Oct. 26, 2012, 11 pages.
Ekmekcioglu E. et al., "Content Adaptive Enhancement of Multi-View Depth Maps for Free Viewpoint Video", IEEE Journal of Selected Topics in Signal Processing, vol. 5, Apr. 2011, pp. 352-361.

(Continued)

*Primary Examiner* — Michael Lee
(74) *Attorney, Agent, or Firm* — Harrington & Smith

(57) ABSTRACT

There is disclosed a method, an apparatus, a server, a client and a non-transitory computer readable medium comprising a computer program stored therein for video coding and decoding. Depth pictures from a plurality of viewing angles are projected into a single viewing angle, making it possible to have pixel-wise joint filtering to be applied to all projected depth values. This approach enables to suppress the noise in the depth map data and provides improved performance for a view synthesis.

24 Claims, 7 Drawing Sheets

(56) References Cited

OTHER PUBLICATIONS

Shimizu S. et al., "Free-Viewpoint Scalable Multi-View Video Coding Using Panoramic Mosaic Depth Maps", 16th European Signal Processing Conference (EUSIPCO 2008), Aug. 25-29, 2008, Lausanne, Switzerland, p. 3, col. 2, Paragraph 4.
Smolic et al., "3D Video and Free Viewpoint Video—Technologies, Applications and MPEG Standards",IEEE International Conference on Multimedia and Expo, Jul. 9-12, 2006, pp. 2161-2164.
Vetro et al., "Towards a 3D Video Format for Auto-Stereoscopic Displays", SPIE Conference on Applications of Digital Image Processing, vol. 7073, Sep. 2008, 12 pages.
Scharstein et al., "A Taxonomy and Evaluation of Dense Two-Frame Stereo Correspondence Algorithms", International Journal of Computer Vision, vol. 47, Issue 1-3, Apr. 2002, pp. 7-42.
Anderson et al., "Experimental Characterization of Commercial Flash Ladar Devices", International Conference of Sensing and Technology, Nov. 2005, 7 pages.
Kim et al., "Design and Calibration of a Multi-view TOF Sensor Fusion System", IEEE Computer Society Conference on Computer Vision and Pattern Recognition Workshops, Jun. 23-28, 2008, 7 pages.
Tanimoto et al., "Depth Estimation Reference Software (DERS) 4.0", ISO/IEC JTC1/SC29/WG11, MPEG 2009/M16605, London, UK, Jun. 2009, 3 pages.
Fehn, "Depth-Image-Based Rendering (DIBR), Compression and Transmission for a New Approach on 3D-TV", Proceedings of the SPIE Stereoscopic Displays and Virtual Reality Systems XI, vol. 5291, May 21, 2004, 6 pages.
Merkle et al., "The Effects of Multiview Depth Video Compression on Multiview Rendering", Signal Processing: Image Communication, vol. 24, Issue 1-2, Jan. 2009, pp. 73-88.
Eisert et al., "Multi-Hypothesis, Volumetric Reconstruction of 3-D Objects from Multiple Calibrated Camera Views", IEEE International Conference on Acoustics, Speech, and Signal Processing, vol. 6, Mar. 15-19, 1999, 4 pages.
Ekmekcioglu et al., "Multi-View Depth Processing Using Joint Filtering for Improved Coding Performance", ISO/IECJTC1/SC29/WG11, MPEG2010/M20070, Geneva, Switzerland, Mar. 2011, 11 pages.
H.264 Advanced Video Coding, Vcodex, Retrieved Feb. 17, 2015, from http://www.vcodex.com/h264.html, 2 pages.
ISO/IEC 23002-3:2007, Information technology—MPEG video technologies—Part 3: Representation of auxiliary video and supplemental information, International Organization for Standardization, Retrieved Feb. 17, 2015, from http://www.iso.org/iso/catalogue_detail.htm?csnumber=44354, 3 pages.

\* cited by examiner

APPARATUS, A METHOD AND A COMPUTER PROGRAM FOR VIDEO CODING AND DECODING

TECHNICAL FIELD

The present invention relates to an apparatus, a method and a computer program for video coding and decoding.

BACKGROUND INFORMATION

Various technologies for providing three-dimensional (3D) video content are currently investigated and developed. Especially, intense studies have been focused on various multiview applications wherein a viewer is able to see only one pair of stereo video from a specific viewpoint and another pair of stereo video from a different viewpoint. One of the most feasible approaches for such multiview applications has turned out to be such wherein only a limited number of input views, e.g. a mono or a stereo video plus some supplementary data, is provided to a decoder side and all required views are then rendered (i.e. synthesized) locally by the decoder to be displayed on a display. Several technologies for view rendering are available, and for example, depth image-based rendering (DIBR) has shown to be a competitive alternative. A typical implementation of DIBR takes a stereoscopic video and corresponding depth information with stereoscopic baseline as input and synthesizes an unlimited number of virtual views between the two input views.

However, in order to enable multiview rendering at the decoder side, texture data should be available at the decoder side along with the corresponding depth data. The depth information is usually a result of an estimation procedure based on stereo correspondences in input videos or an outcome of a noisy and low-resolution range sensor.

In both approaches of depth map estimation, the depth for each stereo camera view is estimated independently. As a result the independent processing, the resulting depth values estimated at different views can include inconsistencies among the views due to the presence of independent noise in each of the views.

A further source of inconsistency in multiview depth information may result from depth map compression, especially if carried out with conventional video compression systems, such as Advanced Video Coding standard H.264/AVC or the Multiview Video Coding MVC extension of H.264/AVC. These codecs are not optimized for depth data characteristics and may therefore introduce significant coding artifacts to the reconstructed depth data.

Thus, there is a need for improvements relating to depth map data consistency.

SUMMARY

This invention proceeds from the consideration that depth pictures from a plurality of viewing angles are projected into a single viewing angle, making it possible to have pixel-wise joint filtering to be applied to all projected depth values. This approach enables to suppress the noise in the depth map data and can provide improved performance for a view synthesis.

According to a first aspect of the invention, there is provided an apparatus comprising:

a video encoder configured for encoding multiple camera view representations, wherein said video encoder is further configured for projecting a first depth picture representing a first view of a multiple camera view representation onto a first projected depth picture representing a second view;

obtaining a second depth picture representing the second view;

obtaining at least one filter parameter;

filtering the first projected depth picture and the second depth picture jointly using the at least one filter parameter into a filtered depth picture;

projecting at least a part of the filtered depth picture onto a first back-projected depth picture representing the first view; and forming the first converted depth picture by replacing at least a part of pixel values of the first depth picture with the first back-projected depth picture.

According to a second aspect of the invention there is provided a method comprising:

projecting a first depth picture representing a first view of a multiple camera view representation onto a first projected depth picture representing a second view;

obtaining a second depth picture representing the second view;

obtaining at least one filter parameter;

filtering the first projected depth picture and the second depth picture jointly using the at least one filter parameter into a filtered depth picture;

projecting at least a part of the filtered depth picture onto a first back-projected depth picture representing the first view; and forming the first converted depth picture by replacing at least a part of pixel values of the first depth picture with the first back-projected depth picture.

According to a third aspect there is provided a computer readable storage medium stored with code thereon for use by an apparatus, which when executed by a processor, causes the apparatus to perform:

projecting a first depth picture representing a first view of a multiple camera view representation onto a first projected depth picture representing a second view;

obtaining a second depth picture representing the second view;

obtaining at least one filter parameter;

filtering the first projected depth picture and the second depth picture jointly using the at least one filter parameter into a filtered depth picture;

projecting at least a part of the filtered depth picture onto a first back-projected depth picture representing the first view; and forming the first converted depth picture by replacing at least a part of pixel values of the first depth picture with the first back-projected depth picture.

According to a fourth aspect there is provided at least one processor and at least one memory, said at least one memory stored with code thereon, which when executed by said at least one processor, causes an apparatus to perform:

receiving transform coefficient identifiers indicating position of the last non-zero coefficient in a transform block;

including a predetermined number of low frequency coefficient identifiers as individual entries in an adaptive variable-length coding table;

grouping remaining coefficient identifiers into groups of a plurality of identifiers in a predetermined scan order; and allocating each group one entry in the adaptive variable-length coding table.

According to a fifth aspect there is provided an apparatus comprising:

a video decoder configured for decoding multiple camera view representations, wherein said video decoder is further configured for projecting a first depth picture representing a first view of a multiple camera view representation onto a first projected depth picture representing a second view;

obtaining a second depth picture representing the second view;

obtaining at least one filter parameter;

filtering the first projected depth picture and the second depth picture jointly using the at least one filter parameter into a filtered depth picture;

projecting at least a part of the filtered depth picture onto a first back-projected depth picture representing the first view; and forming the first converted depth picture by replacing at least a part of pixel values of the first depth picture with the first back-projected depth picture.

According to a sixth aspect there is provided a video encoder configured for encoding multiple camera view representations, wherein said video encoder is further configured for projecting a first depth picture representing a first view of a multiple camera view representation onto a first projected depth picture representing a second view;

obtaining a second depth picture representing the second view;

obtaining at least one filter parameter;

filtering the first projected depth picture and the second depth picture jointly using the at least one filter parameter into a filtered depth picture;

projecting at least a part of the filtered depth picture onto a first back-projected depth picture representing the first view; and forming the first converted depth picture by replacing at least a part of pixel values of the first depth picture with the first back-projected depth picture.

According to a seventh aspect there is provided a video configured for decoding multiple camera view representations, wherein said video decoder is further configured for projecting a first depth picture representing a first view of a multiple camera view representation onto a first projected depth picture representing a second view;

obtaining a second depth picture representing the second view;

obtaining at least one filter parameter;

filtering the first projected depth picture and the second depth picture jointly using the at least one filter parameter into a filtered depth picture;

projecting at least a part of the filtered depth picture onto a first back-projected depth picture representing the first view; and forming the first converted depth picture by replacing at least a part of pixel values of the first depth picture with the first back-projected depth picture.

DESCRIPTION OF THE DRAWINGS

For better understanding of the present invention, reference will now be made by way of example to the accompanying drawings in which.

DETAILED DESCRIPTION OF SOME EXAMPLE EMBODIMENTS OF THE INVENTION

Figure 1:
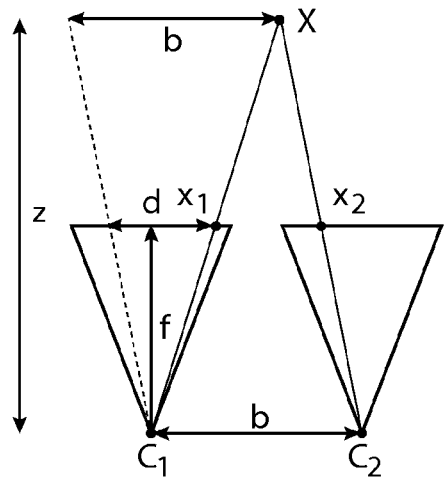
FIG. 1 shows a simplified 2D model of a stereoscopic camera setup.

In order to understand the various aspects of the invention and the embodiments related thereto, the following describes briefly some closely related aspects of video coding.

Some key definitions, bitstream and coding structures, and concepts of H.264/AVC are described in this section as an example of a video encoder, decoder, encoding method, decoding method, and a bitstream structure, wherein the embodiments may be implemented. The aspects of the invention is not limited to H.264/AVC, but rather the description is given for one possible basis on top of which the invention may be partly or fully realized.

The H.264/AVC standard was developed by the Joint Video Team (JVT) of the Video Coding Experts Group (VCEG) of the Telecommunications Standardisation Sector of International Telecommunication Union (ITU-T) and the Moving Picture Experts Group (MPEG) of International Standardisation Organisation (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

Similarly to earlier video coding standards, the bitstream syntax and semantics as well as the decoding process for error-free bitstreams are specified in H.264/AVC. The encoding process is not specified, but encoders must generate conforming bitstreams. Bitstream and decoder conformance can be verified with the Hypothetical Reference Decoder (HRD), which is specified in Annex C of H.264/AVC. The standard contains coding tools that help in coping with transmission errors and losses, but the use of the tools in encoding is optional and no decoding process has been specified for erroneous bitstreams.

The elementary unit for the input to an H.264/AVC encoder and the output of an H.264/AVC decoder is a picture. A picture may either be a frame or a field. A frame comprises a matrix of luma samples and corresponding chroma samples.

A field is a set of alternate sample rows of a frame and may be used as encoder input, when the source signal is interlaced. A macroblock is a 16×16 block of luma samples and the corresponding blocks of chroma samples. A picture is partitioned to one or more slice groups, and a slice group contains one or more slices. A slice consists of an integer number of macroblocks ordered consecutively in the raster scan within a particular slice group.

The elementary unit for the output of an H.264/AVC encoder and the input of an H.264/AVC decoder is a Network Abstraction Layer (NAL) unit. Decoding of partially lost or corrupted NAL units is typically difficult. For transport over packet-oriented networks or storage into structured files, NAL units are typically encapsulated into packets or similar structures. A bytestream format has been specified in H.264/AVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention is performed always regardless of whether the bytestream format is in use or not.

H.264/AVC, as many other video coding standards, allows splitting of a coded picture into slices. In-picture prediction is disabled across slice boundaries. Thus, slices can be regarded as a way to split a coded picture into independently decodable pieces, and slices are therefore elementary units for transmission.

Some profiles of H.264/AVC enable the use of up to eight slice groups per coded picture. When more than one slice group is in use, the picture is partitioned into slice group map units, which are equal to two vertically consecutive macroblocks when the macroblock-adaptive frame-field (MBAFF) coding is in use and equal to a macroblock otherwise. The picture parameter set contains data based on which each slice group map unit of a picture is associated with a particular slice group. A slice group can contain any slice group map units, including non-adjacent map units. When more than one slice group is specified for a picture, the flexible macroblock ordering (FMO) feature of the standard is used.

In H.264/AVC, a slice consists of one or more consecutive macroblocks (or macroblock pairs, when MBAFF is in use) within a particular slice group in raster scan order. If only one slice group is in use, H.264/AVC slices contain consecutive macroblocks in raster scan order and are therefore similar to the slices in many previous coding standards. In some profiles of H.264/AVC slices of a coded picture may appear in any order relative to each other in the bitstream, which is referred to as the arbitrary slice ordering (ASO) feature. Otherwise, slices must be in raster scan order in the bitstream.

NAL units consist of a header and payload. The NAL unit header indicates the type of the NAL unit and whether a coded slice contained in the NAL unit is a part of a reference picture or a non-reference picture. The header for SVC and MVC NAL units additionally contains various indications related to the scalability and multiview hierarchy.

NAL units can be categorized into Video Coding Layer (VCL) NAL units and non-VCL NAL units. VCL NAL units are either coded slice NAL units, coded slice data partition NAL units, or VCL prefix NAL units. Coded slice NAL units contain syntax elements representing one or more coded macroblocks, each of which corresponds to a block of samples in the uncompressed picture. There are four types of coded slice NAL units: coded slice in an Instantaneous Decoding Refresh (IDR) picture, coded slice in a non-IDR picture, coded slice of an auxiliary coded picture (such as an alpha plane) and coded slice extension (for SVC slices not in the base layer or MVC slices not in the base view). A set of three coded slice data partition NAL units contains the same syntax elements as a coded slice. Coded slice data partition A comprises macroblock headers and motion vectors of a slice, while coded slice data partition B and C include the coded residual data for intra macroblocks and inter macroblocks, respectively. It is noted that the support for slice data partitions is only included in some profiles of H.264/AVC. A VCL prefix NAL unit precedes a coded slice of the base layer in SVC and MVC bitstreams and contains indications of the scalability hierarchy of the associated coded slice.

A non-VCL NAL unit may be of one of the following types: a sequence parameter set, a picture parameter set, a supplemental enhancement information (SEI) NAL unit, an access unit delimiter, an end of sequence NAL unit, an end of stream NAL unit, or a filler data NAL unit. Parameter sets are essential for the reconstruction of decoded pictures, whereas the other non-VCL NAL units are not necessary for the reconstruction of decoded sample values and serve other purposes presented below.

Parameters that remain unchanged through a coded video sequence are included in a sequence parameter set. In addition to the parameters that are essential to the decoding process, the sequence parameter set may optionally contain video usability information (VUI), which includes parameters that are important for buffering, picture output timing, rendering, and resource reservation. A picture parameter set contains such parameters that are likely to be unchanged in several coded pictures. No picture header is present in H.264/AVC bitstreams but the frequently changing picture-level data is repeated in each slice header and picture parameter sets carry the remaining picture-level parameters. H.264/AVC syntax allows many instances of sequence and picture parameter sets, and each instance is identified with a unique identifier. Each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets are received at any moment before they are referenced, which allows transmission of parameter sets using a more reliable transmission mechanism compared to the protocols used for the slice data. For example, parameter sets can be included as a parameter in the session description for H.264/AVC Real-time Transport Protocol (RTP) sessions. If parameter sets are transmitted in-band, they can be repeated to improve error robustness.

An SEI NAL unit contains one or more SEI messages, which are not required for the decoding of output pictures but assist in related processes, such as picture output timing, rendering, error detection, error concealment, and resource reservation. Several SEI messages are specified in H.264/AVC, and the user data SEI messages enable organizations and companies to specify SEI messages for their own use. H.264/AVC contains the syntax and semantics for the specified SEI messages but no process for handling the messages in the recipient is defined. Consequently, encoders are required to follow the H.264/AVC standard when they create SEI messages, and decoders conforming to the H.264/AVC standard are not required to process SEI messages for output order conformance. One of the reasons to include the syntax and semantics of SEI messages in H.264/AVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

A coded picture consists of the VCL NAL units that are required for the decoding of the picture. A coded picture can be a primary coded picture or a redundant coded picture. A primary coded picture is used in the decoding process of valid bitstreams, whereas a redundant coded picture is a redundant representation that should only be decoded when the primary coded picture cannot be successfully decoded.

An access unit consists of a primary coded picture and those NAL units that are associated with it. The appearance order of NAL units within an access unit is constrained as follows. An optional access unit delimiter NAL unit may indicate the start of an access unit. It is followed by zero or more SEI NAL units. The coded slices or slice data partitions of the primary coded picture appear next, followed by coded slices for zero or more redundant coded pictures.

An access unit in MVC is defined to be a set of NAL units that are consecutive in decoding order and contain exactly one primary coded picture consisting of one or more view components. In addition to the primary coded picture, an access unit may also contain one or more redundant coded pictures, one auxiliary coded picture, or other NAL units not containing slices or slice data partitions of a coded picture. The decoding of an access unit always results in one decoded picture consisting of one or more decoded view components. In other words, an access unit in MVC contains the view components of the views for one output time instance.

A view component in MVC is referred to as a coded representation of a view in a single access unit. An anchor picture is a coded picture in which all slices may reference only slices within the same access unit, i.e., inter-view prediction may be used, but no inter prediction is used, and all following coded pictures in output order do not use inter prediction from any picture prior to the coded picture in decoding order. Inter-view prediction may be used for IDR view components that are part of a non-base view. A base view in MVC is a view that has the minimum value of view order index in a coded video sequence. The base view can be decoded independently of other views and does not use inter-view prediction. The base view can be decoded by H.264/AVC decoders supporting only the single-view profiles, such as the Baseline Profile or the High Profile of H.264/AVC.

In the MVC standard, many of the sub-processes of the MVC decoding process use the respective sub-processes of the H.264/AVC standard by replacing term "picture", "frame", and "field" in the sub-process specification of the H.264/AVC standard by "view component", "frame view component", and "field view component", respectively. Likewise, terms "picture", "frame", and "field" are often used in the following to mean "view component", "frame view component", and "field view component", respectively.

A coded video sequence is defined to be a sequence of consecutive access units in decoding order from an IDR access unit, inclusive, to the next IDR access unit, exclusive, or to the end of the bitstream, whichever appears earlier.

A group of pictures (GOP) is and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An H.264/AVC decoder can recognize an intra picture starting an open GOP from the recovery point SEI message in an H.264/AVC bitstream. A closed GOP is such a group of pictures in which all pictures can be correctly decoded when the decoding starts from the initial intra picture of the closed GOP. In other words, no picture in a closed GOP refers to any pictures in previous GOPs. In H.264/AVC, a closed GOP starts from an IDR access unit. As a result, closed GOP structure has more error resilience potential in comparison to the open GOP structure, however at the cost of possible reduction in the compression efficiency. Open GOP coding structure is potentially more efficient in the compression, due to a larger flexibility in selection of reference pictures.

The bitstream syntax of H.264/AVC indicates whether a particular picture is a reference picture for inter prediction of any other picture. Pictures of any coding type (I, P, B) can be reference pictures or non-reference pictures in H.264/AVC. The NAL unit header indicates the type of the NAL unit and whether a coded slice contained in the NAL unit is a part of a reference picture or a non-reference picture.

H.264/AVC specifies the process for decoded reference picture marking in order to control the memory consumption in the decoder. The maximum number of reference pictures used for inter prediction, referred to as M, is determined in the sequence parameter set. When a reference picture is decoded, it is marked as "used for reference". If the decoding of the reference picture caused more than M pictures marked as "used for reference", at least one picture is marked as "unused for reference". There are two types of operation for decoded reference picture marking: adaptive memory control and sliding window. The operation mode for decoded reference picture marking is selected on picture basis. The adaptive memory control enables explicit signaling which pictures are marked as "unused for reference" and may also assign long-term indices to short-term reference pictures. The adaptive memory control requires the presence of memory management control operation (MMCO) parameters in the bitstream. If the sliding window operation mode is in use and there are M pictures marked as "used for reference", the short-term reference picture that was the first decoded picture among those short-term reference pictures that are marked as "used for reference" is marked as "unused for reference". In other words, the sliding window operation mode results into first-in-first-out buffering operation among short-term reference pictures.

A Decoded Picture Buffer (DPB) may be used in the encoder and/or in the decoder. There are two reasons to buffer decoded pictures, for references in inter prediction and for reordering decoded pictures into output order. As H.264/AVC provides a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as reference and needed for output.

The Multiview Video Coding (MVC) extension of H.264 referred above enables to implement a multiview functionality at the decoder, thereby allowing the development of three-dimensional (3D) multiview applications. Next, for better understanding the embodiments of the invention, some aspects of 3D multiview applications and technical challenges related thereto are described briefly.

Stereoscopic video content consists of pairs of offset images that are shown separately to the left and right eye of the viewer. These offset images are captured with a specific stereoscopic camera setup and it assumes a particular stereo baseline distance between cameras.

FIG. 1 shows a simplified 2D model of such stereoscopic camera setup. In FIG. 1, C1 and C2 refer to cameras of the stereoscopic camera setup, more particularly to the center locations of the cameras, b is the distance between the centers of the two cameras (i.e. the stereo baseline), f is the focal length of cameras and X is an object in the real 3D scene that is being captured. The real world object X is projected to different locations in images captured by the cameras C1 and C2, these locations being x1 and x2 respectively. The horizontal distance between x1 and x2 in absolute coordinates of the image is called disparity. The images that are captured by the camera setup are called stereoscopic images, and the disparity presented in these images creates or enhances the illusion of depth. For enabling the images to be shown separately to the left and right eye of the viewer, typically specific 3D glasses are required to be used by the viewer. Adaptation of the disparity is a key feature for adjusting the stereoscopic video content to be comfortably viewable on various displays.

Figure 2:
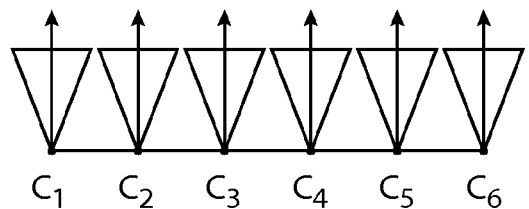
FIG. 2 shows a simplified model of a multiview camera setup.

However, disparity adaptation is not a straightforward process. It requires either having additional camera views with different baseline distance (i.e., b is variable) or rendering of virtual camera views which were not available in real world. FIG. 2 shows a simplified model of such multiview camera setup that suits to this solution. This setup is able to provide stereoscopic video content captured with several discrete values for stereoscopic baseline and thus allow stereoscopic display to select a pair of cameras that suits to the viewing conditions.

Figure 3:
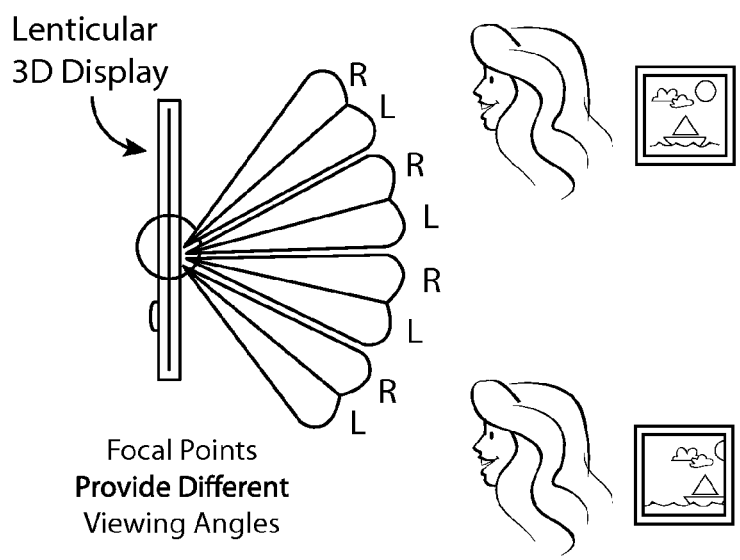
FIG. 3 shows a simplified model of a multiview autostereoscopic display (ASD)

A more advanced approach for 3D vision is having a multiview autostereoscopic display (ASD) that does not require glasses. The ASD emits more than one view at a time but the emitting is localized in the space in such a way that a viewer sees only a stereo pair from a specific viewpoint, as illustrated in FIG. 3, wherein the boat is seen in the middle of the view when looked at the right-most viewpoint. Moreover, the viewer is able see another stereo pair from a different viewpoint, e.g. in FIG. 3 the boat is seen at the right border of the view when looked at the left-most viewpoint. Thus, motion parallax viewing is supported if consecutive views are stereo pairs and they are arranged properly. The ASD technologies are capable of showing 52 or more different images at the same time, of which only a stereo pair is visible from a specific viewpoint. This supports multiuser 3D vision without glasses, for example in a living room environment.

The above-described stereoscopic and ASD applications require multiview video to be available at the display. The MVC extension of H.264/AVC video coding standard allows the multiview functionality at the decoder side. The base view of MVC bitstreams can be decoded by any H.264/AVC decoder, which facilitates introduction of stereoscopic and multiview content into existing services. MVC allows inter-view prediction, which can result into significant bitrate saving compared to independent coding of all views, depending on how correlated the adjacent views are. However, the rate of MVC coded video is proportional to the number of views. Considering that ASD may require, for example, 52 views as input, the total bitrate for such number of views challenges the constraints of the available bandwidth.

Consequently, it has been found that a more feasible solution for such multiview application is to have a limited number of input views, e.g. a mono or a stereo view plus some supplementary data, and to render (i.e. synthesize) all required views locally at the decoder side. From several available technologies for view rendering, depth image-based rendering (DIBR) has shown to be a competitive alternative.

Figure 4:
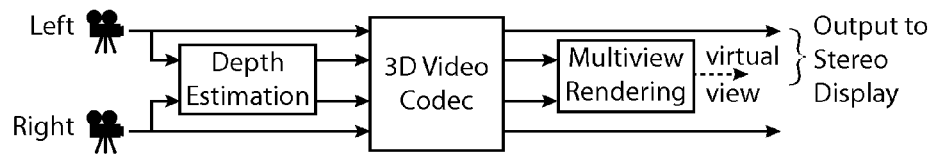
FIG. 4 shows a simplified model of a DIBR-based 3DV system.

A simplified model of a DIBR-based 3DV system is shown in FIG. 4. The input of a 3D video codec comprises a stereoscopic video and corresponding depth information with stereoscopic baseline b0. Then the 3D video codec synthesizes an unlimited number of virtual views between two input views with baseline (bi<b0). DIBR algorithms may also enable extrapolation of views that are outside the two input views and not in between them. Similarly, DIBR algorithms may enable view synthesis from a single view of texture and the respective depth view. However, in order to enable DIBR-based multiview rendering, texture data should be available at the decoder side along with the corresponding depth data.

In such 3DV system, depth information is produced at the encoder side in a form of depth pictures (also known as depth maps) for each video frame. A depth map is an image with per-pixel depth information. Each sample in a depth map represents the distance of the respective texture sample from the plane on which the camera lies. In other words, if the z axis is along the shooting axis of the cameras (and hence orthogonal to the plane on which the cameras lie), a sample in a depth map represents the value on the z axis.

Depth information can be obtained by various means. For example, depth of the 3D scene may be computed from the disparity registered by capturing cameras. A depth estimation algorithm takes a stereoscopic view as an input and computes local disparities between the two offset images of the view. Each image is processed pixel by pixel in overlapping blocks, and for each block of pixels a horizontally localized search for a matching block in the offset image is performed. Once a pixel-wise disparity is computed, the corresponding depth value z is calculated by equation (1):

$$z = \frac{f \cdot b}{d + \Delta d}, \quad (1)$$

where f is the focal length of the camera and b is the baseline distance between cameras, as shown in FIG. 1. Further, d refers to the disparity observed between the two cameras, and the camera offset $\Delta d$ reflects a possible horizontal misplacement of the optical centers of the two cameras. However, since the algorithm is based on block matching, the quality of a depth-through-disparity estimation is content dependent and very often not accurate. For example, no straightforward solution for depth estimation is possible for image fragments that are featuring very smooth areas with no textures or large level of noise.

Figure 5:
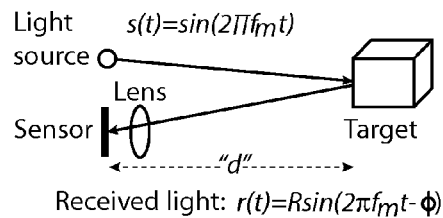
FIGS. 5 and 6 show an example of a TOF-based depth estimation system.
Figure 6:
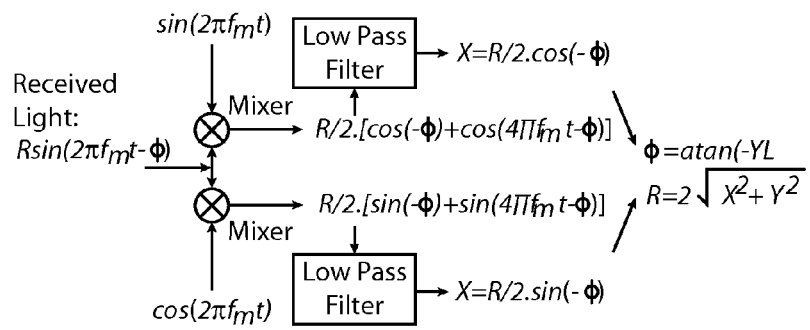

Alternatively, or in addition to the above-described stereo view depth estimation, the depth value may be obtained using the time-of-flight (TOF) principle. FIGS. 5 and 6 show an example of a TOF-based depth estimation system. The camera is provided with a light source, for example an infrared emitter, for illuminating the scene. Such an illuminator is arranged to produce an intensity modulated electromagnetic emission for a frequency between 10-100 MHz, which typically requires LEDs or laser diodes to be used. Infrared light is typically used to make the illumination unobtrusive. The light reflected from objects in the scene is detected by an image sensor, which is modulated synchronously at the same frequency as the illuminator. The image sensor is provided with optics; a lens gathering the reflected light and an optical bandpass filter for passing only the light with the same wavelength as the illuminator, thus helping to suppress background light. The image sensor measures for each pixel the time the light has taken to travel from the illuminator to the object and back. The distance to the object is represented as a phase shift in the illumination modulation, which can be determined from the sampled data simultaneously for each pixel in the scene.

In contrast to the stereo view depth estimation, the accuracy of the TOF-based depth estimation is mostly content independent. For example, it is not suffering from the lack of textural appearance in the content. However, currently available TOF cameras have low pixel resolution sensors and the depth estimation is heavily influenced by random and systematic noise. No hardware-independent method for noise suppression and actual depth value recovery for TOF systems is available. Moreover, DIBR-based rendering assumes that depth map data is to be associated with texture data for every view. In other words, a multiview capturing system should include multiple TOF cameras. Since each TOF camera estimates the depth value independently, each with its own random and systematic noise, this could lead to a significant inconsistency in the resulting depth maps for a multiview system design.

Figures 7A, 7B:
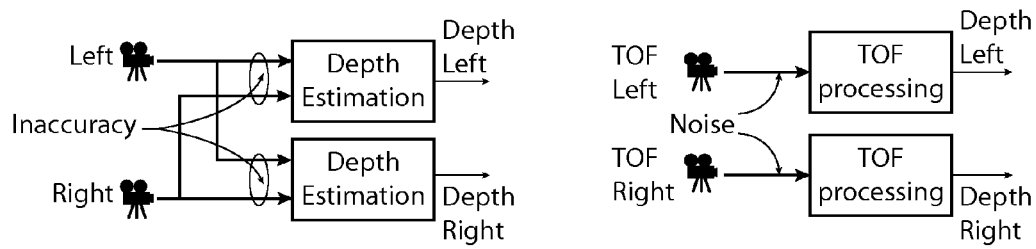
FIGS. 7a and 7b summarize challenges in obtaining accurate depth information.

The challenges in obtaining accurate depth information can be summarized according to FIGS. 7a and 7b. In the stereo view depth estimation shown in FIG. 7a, the inaccuracy in the depth information is usually a result of the estimation procedure based on stereo correspondences in input videos. In the TOF-based depth estimation shown in FIG. 7b, the inaccuracy in the depth information is usually an outcome of a noisy and low-resolution range sensor. In both approaches, the depth for each camera view is estimated independently. Consequently, the resulting depth values estimated at different views may involve inconsistency among the views due to presence of independent noise in each of views. Noise can be systematic as well as random, resulting e.g. from camera sensors.

Most commonly, depth map compression is performed with standard hybrid video coding algorithms, e.g. H.264/AVC or MVC. Compression efficiency of these coding schemes is largely dependent on performance of motion compensated prediction (MCP), which is utilized to employ temporal redundancy in H.264/AVC and to employ inter-view redundancy in the MVC coding. Therefore, a possible inconsistency in depth data affects the MCP chains of the encoders and thus significantly reduces the compression efficiency of encoders. From this perspective, it is highly desirable to perform either filtering or denoising of the depth map data as a pre-processing step before encoding.

However, inaccuracy of depth estimation is not the only source of inconsistency in the multiview depth information. The multiview depth information can become inconsistent due to coding artifacts, which may be introduced to the depth map with conventional video compression systems, such as H.264/AVC or MVC, or any other type of depth map compression system or method. Conventional hybrid video codecs are not optimized for depth data characteristics and may thus introduce significant coding artifacts to the reconstructed depth data. A typical problem in the motion compensation hybrid video coding for depth maps is the inability to represent sharp object boundaries accurately and without artifacts, such as ringing. Moreover, typical video encoder approaches use rate-distortion optimized mode selection, which often turns out to result into the relatively frequent use of skip mode and not-coded residual blocks. While the coded bitstream is rate-distortion-optimal in terms of depth peak signal-to-noise ratio (PSNR), the depth images may suffer from false vertical and horizontal edges and consequently the view synthesis result may become suboptimal.

Now in order to improve the accuracy of depth estimation and the efficiency of inter-view prediction, a joint filtering is performed for the depth map data which is provided in a multiview representation. It is assumed that a multiview representation of 3D scene is available, and depth information for each view is presented in a form of per-pixel depth map values. The depth pictures from all available viewing angles are projected into a single viewing angle (which can also be referred to as a viewpoint or a camera position). Pixel-wise joint filtering is applied to all projected depth values within a certain interval, which is here referred to as a confidence interval even though it does not necessarily have a statistical definition. A weighted average filter may used in the process. The inverse projections, back to the original viewing angles, may follow this joint filtering process.

The joint filtering can be implemented as a pre-processing that precedes encoding or a post-processing that succeeds decoding, or it can be implemented in the encoding loop and in the decoding loop of a compression system. In the case of in-loop implementation, the parameters for the process are sent to the decoder side as side information.

Depth map data, which either is the outcome of a depth estimation process or is reconstructed at the decoder side from coded depth pictures, can be modeled as a sum of real (ground truth) depth value $d_r$ and a noise component n, which was introduced by inaccuracy of depth estimation and/or artifacts of coding process. Thus, a depth of a real life object is estimated as:

$$d = d_r + n \qquad (2)$$

Assuming that each depth map is processed independently (estimated or coded), the noise components n in depth maps of different views are uncorrelated, in contrast to the real depth value:

$$d_1 = d_r + n_1$$

$$d_2 = d_r + n_2$$

$$d_N = d_r + n_N \qquad (3)$$

Therefore, depth map data that is representing a real-world object in different views $\{d_1, d_2 \ldots d_N\}$ can be considered as a multi-hypothesis estimate of an actual depth value $d_r$. Joint processing of these estimates enables to estimate the real depth $d_r$, and thus to suppress the noise component n.

Figure 8:
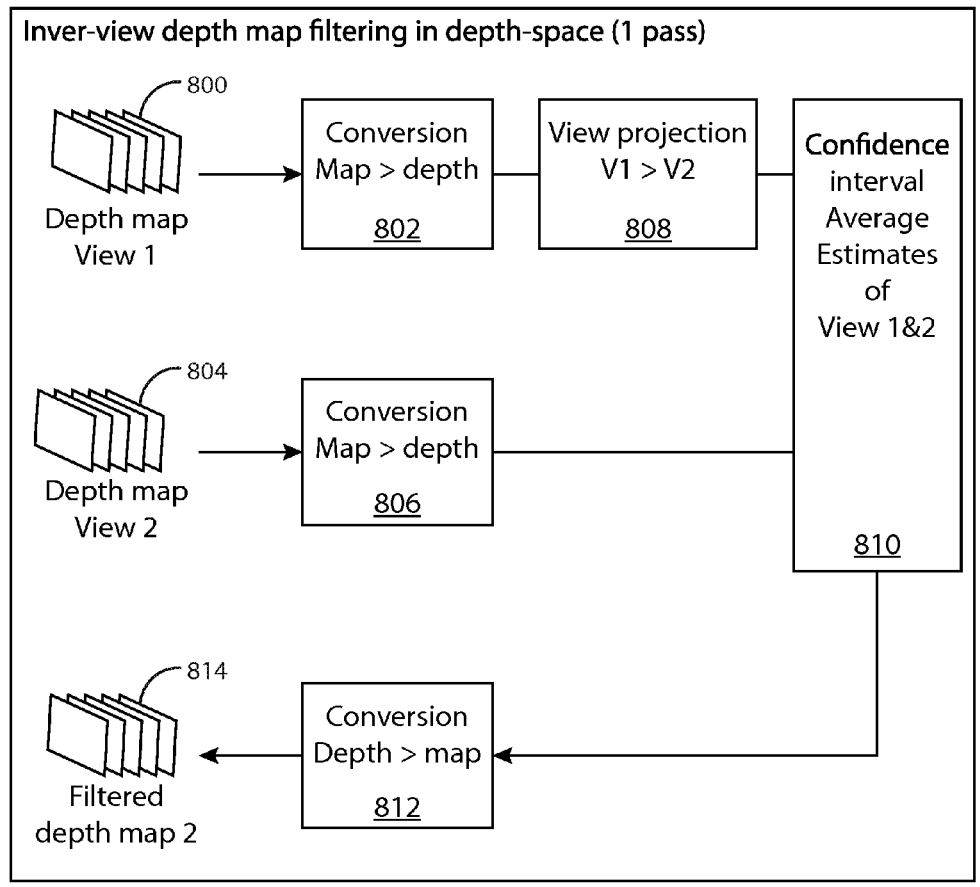
FIG. 8 shows the principle of joint multiview filtering for multiview depth map data in some embodiments of the invention.

FIG. 8 shows the principle of joint multiview filtering for multiview depth map data in a simple implementation, wherein it is assumed that a multiview representation of 3D scene is available. A depth map 800 of one of available views (View 1) is converted 802 into the depth space (Z-space). Similarly, a depth map 804 of another arbitrary view (View 2), which is different from View 1, is converted 806 into the depth space. Following these, the original and possibly noisy depth values of View 1 are projected 808 to the depth values of the arbitrary View 2. The projection creates two noisy estimates of the real depth value. It is checked 810 whether both estimates are within a predetermined confidence interval. If affirmative, the estimates are averaged in order to produce a denoised estimate of the real depth value. Once the average computing procedure has been carried out for each pixel, the denoised estimate of the depth values are converted 812 back to a filtered depth map 814 to be used for both in View 1 and View 2.

The above filtering has low computational complexity. Therefore, the proposed solution can be utilized as:
1. A pre-processing stage, prior to encoding and transmitting for production of depth map data
2. A post-processing stage, prior to DIBR, for coding artifacts suppression and to improve the consistency of multiview depth data,
3. A part of encoder and decoder, for coding artifacts suppressing within a coding loop. Depending on the selected approach it may be may required to transmit supplementary data with encoded bitstream, for example parameters utilized for computing confidence interval or weighting coefficients required for loop filtering or recommended for post-filtering may be transmitted to the decoder side.

For considering a slightly more complex implementation, let us assume that a multiview representation of 3D scene is available, comprising at least three views, View1, View2 and View3, each being different to each other. The depth values $d_1$ of View1 are projected to View2, and this is marked as $d_{1\to 2}$. View2 has the depth value estimate $d_2$ or/and the depth value estimate of View3 is projected to View2, $d_{3\to 2}$. Consequently, for most co-located pixel locations, there will be more than one estimate of real world depth value available.

According to an embodiment, these estimates are filtered by using a weighted average filter, in order to produce an estimated of real-world (ground truth) depth value in View2, $\widehat{d_2}$:

$$\widehat{d_2} = w_1 \cdot d_{1\to 2} + w_2 \cdot d_2 + w_3 \cdot d_{3\to 2} \quad (4),$$

where $w_1$, $w_2$ and $w_3$ are weighting factors or filter coefficients for the depth values of different views or view projections.

According to an embodiment, the filtering may be controlled by one or more further parameter. For example, filtering can be applied if additional depth value estimates belong to a certain confidence interval, or if the absolute difference between the estimates is below a particular threshold ($T_h$).

$$\widehat{d_2} = w_1 \cdot d_{1\to 2} + w_2 \cdot d_2 + w_3 \cdot d_{3\to 2} \quad (5)$$

$w_2 = 1$;
$w_i = 1$, if $|d_{1\to 2} - d_2| < T_h$,
$w_i = 0$ otherwise

According to an embodiment, the filtered value $\widehat{d_2}$ may be projected back to View1, $\widehat{d_1}$. Moreover, the projected value may replace the value in the depth map of View2 or be projected back to View3, $d_{2\to 3}$. If the filtering was not performed for a certain pixel location, e.g. if the absolute difference between the estimates in this pixel location was not below said particular threshold ($T_h$), no value may be back-projected or replaced in any of the depth maps for View1, View2, or View3.

The above-described process may be referred to as Joint multiView Depth Filtering (JVDF). According to an embodiment, the parameters controlling the Joint multiView Depth Filtering (JVDF) of projected depth maps (weights, or weighting function) are included in the bitstream created by an encoder and used by the decoder for decoding depth maps.

There are several options for how the filter parameters are signaled to the decoder side. According to an embodiment, the encoder includes at least one filter parameter for filtering at least one projected depth map into the bitstream being coded. The at least one filter parameter may, for example, be the threshold ($T_h$) for the absolute difference between two co-located projected depth map values determining whether the two co-located projected depth map values are filtered or left intact.

According to an embodiment, the encoder may include the at least one filter parameter into one or more of several syntax structures of the bitstream, including for example a sequence parameter set, a picture parameter set, a slice parameter set, a sequence header, a GOP header, a picture header, a slice header, a macroblock, a coding unit (CU), and a Supplemental Enhancement Information (SEI) message.

According to an embodiment, in addition to or instead of including the at least one filter parameter in the bitstream, the encoder may signal the at least one filter parameter externally from the bitstream. For example, the at least one filter parameter may be included in a meta data or description structures of the file format encapsulating or referring to the bitstream, or included in a header structure, such as in the RTP payload header, used in the encapsulation or transport of the bitstream.

According to an embodiment, the decoder may derive the at least one filter parameter from the bitstream. According to an embodiment, the encoder includes the at least one filter parameter as a syntax element in the bitstream and the decoder parses the syntax element to obtain the at least one filter parameter.

According to an embodiment, available depth views are projected to a virtual view, for which no input depth map data has been available before these projections. These projected depth views are filtered and can be used in any way, for example they can back-projected to available input depth views after filtering, or can be used as such (virtual view).

According to an embodiment, there are more than two depth views projected onto the same virtual view. More than two projected depth views are jointly filtered, and the resulting filtered depth view is back-projected to at least some of the views that were projected onto this virtual view.

Weights $w_i$ utilized in equation (4) provide the possibility to adapt the filtering in a desired manner and they can be produced as a function of multiple factors.

According to an embodiment, the weights can be a function of projection distance. In this case, depth value which is projected from a view that is far from the current view will be weighted with lower weight. In such solution, it is assumed that depth value estimates from closer views are more reliable. For example, the weighting factor of the middle view $d_2$ may be greater than the weighting factors of the projected depth views $d_{1\to 2}$ and $\cdot d_{3\to 2}$, e.g. $w_2 = 1.5\, w_1$, $w_1 = w_3$.

In yet another embodiment, local weights $w_i$ for a particular depth value estimates can be computed from local statistics, for example local variance of original depth image. In this case, estimates of depth values located on the border of some object (and thus subject of estimation error) will have lower weight due to a high local variance in the neighborhood.

In yet another embodiment, weights $w_i$ can be computed at the encoder side from global statistics. For example, a sequence or frame-level information can be considered at the encoder side and resulting $w_i$ are transmitted to the decoder within a bitstream as side information, thus implementing an adaptive filtering.

In yet another embodiment, weights $w_i$ can be computed at the decoder side as a function of encoding/decoding information. For example, motion prediction information (block partitioning, motion vector direction, and consistency of motion information) can be utilized in computing of weights $w_i$ in (4), thus reflecting the reliability of depth value estimate for a particular view.

In yet another embodiment, the "camera position" or "camera angle" for the virtual view is determined adaptively. The adaptation may be determined, for example, on the basis of a cost function which is a weighted sum (over all pixel locations) of differences of the absolute differences of the pixel values projected on the same pixel location. The weight may be equal to all pixel locations or it may be a decreasing function of the average distance of the pixels from the virtual camera; i.e., the further away the pixel is from the camera, the smaller is its weight. Consequently, the weighting function may result into a camera position where the closest pixels are represented by as many original depth views as possible.

According to an embodiment, the "camera position" or "camera angle" for the virtual view may be determined adaptively for parts of the depth picture or for certain objects in the depth space. For example, a "camera position" for a certain area in the background may be selected in such a manner that no occlusions caused by foreground objects appear in that "camera position".

According to an embodiment, texture and depth pictures are used in an encoder or a decoder that uses DIBR-based inter-view prediction in the loop, which may also be referred to as view synthesis prediction. View synthesis prediction may be implemented, for example, as follows: A texture picture of view B is about to be coded/decoded. A texture picture and a depth picture of views $A_n$, where n can be any positive integer, of the same time instant as the texture picture being coded have been coded earlier. A DIBR algorithm is used to synthesize a synthesized texture picture at view B from the texture and depth pictures $A_n$. The synthesized texture picture serves as a prediction reference for prediction for coding/decoding the texture picture at view B, which may be similar to inter prediction or inter-view prediction. The prediction process may, for example, be identical to inter prediction, but whenever the view-synthesized texture picture is used as reference, no motion information (which is typically motion vectors) is encoded but the prediction blocks are spatially co-located with the blocks being coded/decoded.

The encoder runs a mode selection and macroblock/coding-unit partitioning process that may be rate-distortion optimized, i.e. several potential coding modes and macroblock partitionings are coded and the one which is the best in rate-distortion performance is chosen to be encoded into the bitstream. One of the tested modes may include view synthesis prediction using the synthesized texture picture at view B as reference. In the decoder, the decoder reconstructs view synthesized texture pictures at view B provided that the bitstream being decoded indicates the use of view synthesis prediction. It is noted that the view synthesis prediction may be performed block-wise both in the encoder and in the decoder, and hence a complete synthesized texture picture need not be necessarily reconstructed.

According to an embodiment, DIBR-based inter-view prediction (a.k.a. view synthesis prediction) is also applied to encode/decode depth pictures. In other words, one or more depth pictures of views $A_n$, where n can be any positive integer, are used to create a synthesized depth picture of view B. The synthesized depth picture is then used as prediction reference for coding/decoding the depth picture of view B similarly to the view synthesis prediction of texture pictures described above.

According to an embodiment, depth estimation is performed in the coding and decoding loop. In the encoder, the reconstructed texture pictures are used as input to the depth estimation process. Likewise, in the decoder, the decoded texture pictures are used as input to the depth estimation process. The depth estimation process may be implemented by any algorithm, as long as the same algorithm is used both in the encoding and the decoding. For example, a block matching algorithm of a determined or signaled window size may be used. Such signaling of a window size may be carried out using syntax elements within the coded bitstream. The output of the depth estimation process is then filtered using a joint multi-view depth filtering process as described above. In some embodiments, the encoder may not be able to receive depth pictures as input for encoding but depth pictures are generated or estimated in the coding loop as described above.

However, in other embodiments, the encoder may receive depth pictures as input. Herein, the encoder may use the estimated depth pictures as prediction reference to encode the input depth pictures and hence encode residual depth pictures representing the difference between the estimated depth pictures and depth pictures received as input for encoding. Furthermore, the decoder may be able to decode the coded residual depth pictures and sum them up with the estimated depth pictures (derived in the depth estimation process of the decoder) to derive the depth pictures, which are used subsequently in the decoding process and output from the decoder (to be used for DIBR or other purposes).

According to an embodiment, disparity or parallax maps, such as parallax maps specified in ISO/IEC International Standard 23002-3, may be processed similarly to depth maps. Depth and disparity have a straightforward correspondence and they can be computed from each other through mathematical equation. Due this correspondence, noise in depth map data is represented as a noise in disparity data, therefore disparity data can be filtered similarly to depth map data in a JVDF process. Disparity or parallax maps are projected to a certain "camera position" (camera position A) and the disparity/parallax values are relative to another selected camera position (camera position B). Camera positions A and B are used in all the projected disparity/parallax maps in order to be able to filter them jointly.

In some embodiments, a coding system or method for joint coding texture and depth views of depth-enhanced video is applied. Depth-enhanced video refers to texture video having one or more views associated with depth video having one or more depth views. A number of approaches may be used for representing of depth-enhanced video, including the use of video plus depth (V+D), multiview video plus depth (MVD), and layered depth video (LDV). In the video plus depth (V+D) representation, a single view of texture and the respective view of depth are represented as sequences of texture picture and depth pictures, respectively. The MVD representation contains a number of texture views and respective depth views. In the LDV representation, the texture and depth of the central view are represented conventionally, while the texture and depth of the other views are partially represented and cover only the dis-occluded areas required for correct view synthesis of intermediate views. When joint coding texture and depth views is applied for a depth-enhanced video representation, some decoded samples of a texture picture or data elements for decoding of a texture picture are predicted or derived from some decoded samples of a depth picture or data elements obtained in the decoding process of a depth picture. Alternatively or in addition, some decoded samples of a depth picture or data elements for decoding of a depth picture are predicted or derived from some decoded samples of a texture picture or data elements obtained in the decoding process of a texture picture. A depth picture decoding process may include joint multiview depth filtering (JVDF) and the output of filtering and/or back-projection may be used to predict or derive texture sample values or data elements for decoding of a texture picture.

The joint multi-view depth filtering process as described above and the embodiments related thereto provide significant advantages. The process and its embodiments improve consistency of depth data across of available views in multiview based 3D video systems. This in turn allows improving performance of DIBR (view synthesis), if filtered depth data is utilized. Furthermore, the efficiency of Motion Compensated Prediction (MCP) is improved, when applied to utilize inter-view redundancy in depth map data.

Moreover, compression efficiency of 3DV codecs that utilizes a view synthesis based inter-view prediction is improved. Since process and its embodiments produce more consistent multiview depth map data, it improves the efficiency of inter-view prediction which is based on view synthesis and utilizes improved depth map data.

Figure 9:
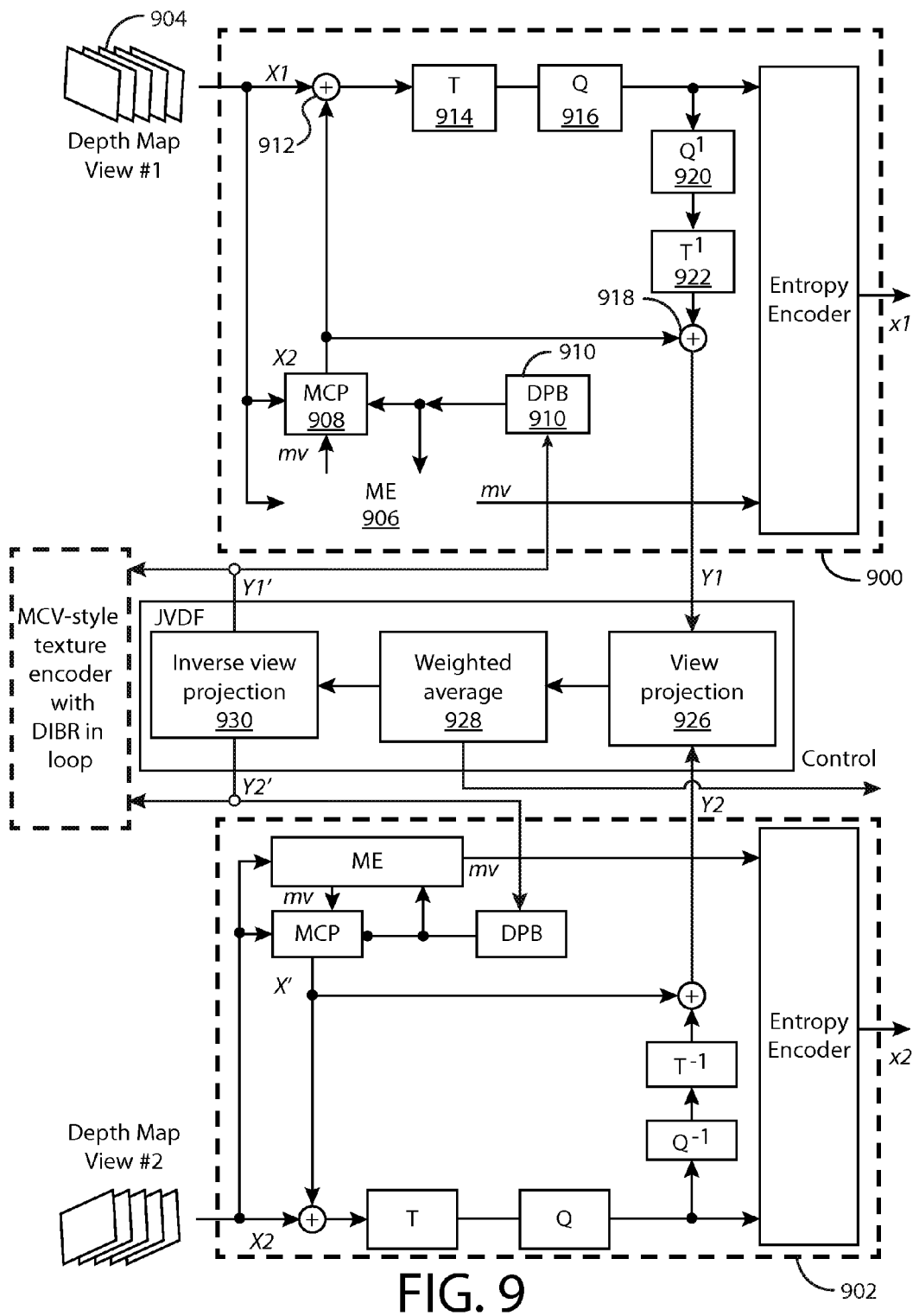
FIG. 9 shows schematically an embodiment of the invention as incorporated within an encoder.

With respect to FIG. 9, a block diagram of a 2-view depth map encoder suitable for carrying out embodiments of the invention is shown. This scheme can be easily extended to support larger amount of coded views. FIG. 9 shows the encoder as comprising similar depth map encoders 900, 902 for both View1 and View2. A depth picture 904 to be encoded is received at motion estimation unit 906, which determines the motion vectors to be used both in motion compensation process and in entropy coding of the image macroblocks. The depth picture 904 to be encoded is also received at motion compensation unit 908, which receives the determined motion vectors from the motion estimation unit 906 and previously-encoded pictures from a reference picture buffer or a decoded picture buffer (DPB) 910. This enables the motion compensation unit 908 to determine a prediction for an image block based only on the already processed parts of current frame or picture. The motion compensation unit may also be perform other types of prediction, such as intra prediction. The output of the motion compensation unit 908 passed to a first summing device 912. The first summing device may subtract the output of the motion compensation unit 908 from the image 900 to produce a first prediction error signal which is input to the prediction error encoder loop. The first summing device may operate on block basis.

The prediction error encoder loop comprises a transform unit 914 and a quantizer 916. The transform unit 914 transforms the first prediction error signal to a transform domain. The transform is, for example, the discrete cosine transform (DCT) or any integer cosine transform (ICT). The quantizer 916 quantizes the transform domain signal, e.g. the DCT coefficients, to form quantized coefficients.

The prediction error decoder (920, 922) receives the output from the quantizer 916 and performs the opposite processes of the prediction error encoder loop to produce a decoded prediction error signal which, when combined with the output of the motion compensation unit 908 at the second summing device 918, produces the preliminary reconstructed image. The second summing device may operate on block basis. The prediction error decoder may be considered to comprise a dequantizer 920, which dequantizes the quantized coefficient values, e.g. DCT coefficients, to reconstruct the transform signal and an inverse transformation unit 922, which performs the inverse transformation to the reconstructed transform signal wherein the output of the inverse transformation unit 922 contains reconstructed block(s) of a first depth picture representing a first view of a multiple camera view representation. Since the transform coefficients were quantized, the dequantizer may not be able to exactly reconstruct the input signal to the quantization unit but the reconstruction may be approximate and consequently the output of the inverse transformation unit may also be an approximate representation of the input to the transform unit.

The entropy encoder 924 receives the output of the prediction error encoder loop and may perform a suitable entropy encoding/variable length encoding on the signal to provide error detection and correction capability. Any suitable entropy encoding algorithm may be employed herein, such as variable length coding (VLC) (i.e. Exponential-Golomb coding (or Exp-Golomb)), Context-adaptive binary arithmetic coding (CABAC) or Context-adaptive variable-length coding (CAVLC).

As is known, the prediction error decoder may also comprise a macroblock filter which may filter the reconstructed macroblocks, received from the output of the inverse transformation unit 922, according to further decoded information and filter parameters.

Herein, the filtering is carried out according to the joint multi-view depth filtering (JVDF) process as described above. Thus, the first depth picture representing a first view of a multiple camera view representation and a second depth picture representing the second view are provided in a view projection unit 926, wherein the first depth picture is projected onto a first projected depth picture representing a second view. The filtering unit 928 is provided with at least one filter parameter, and the first projected depth picture and the second depth picture are filtered jointly using the at least one filter parameter into a filtered depth picture. In the filtering process, the weighted average filtering as described above may be used. In a inverse view projection unit 930, at least a part of the filtered depth picture are projected onto a first back-projected depth picture representing the first view and the first converted depth picture is formed by replacing at least a part of pixel values of the first depth picture with the first back-projected depth picture. The first converted depth picture is then supplied to the virtual decoded picture buffer 910 to be utilized in the motion estimation unit 906 and in the motion compensation unit 908.

JVDF is implemented in such a way that it replaces or complements the loop filter existing in a standard encoder. Parameters of in-loop JVDF can be sent to the decoder side as side information, as shown in FIG. 9 as the "control" signal. In addition to this, processed depth map data may serve to a multi-view texture and/or depth encoder if it utilizes a DIBR-based inter-view prediction in the loop.

Another aspect of the invention is operation of the decoder. With respect to FIG. 10, a block diagram of a 2-view depth map decoder suitable for carrying out embodiments of the invention is shown. This scheme can be easily extended to support larger amount of coded views. The decoder of FIG. 10 comprises functions performing the inverse operations to some of the functions of the encoder of FIG. 9. Similarly, JVDF replaces or complements the loop filter existing in standard decoder. Parameters of in-loop JVDF are received from the bitstream. The decoded depth map data may serve to a multi-view texture decoder if it utilizes a DIBR-based inter-view prediction in the loop.

Figure 10:
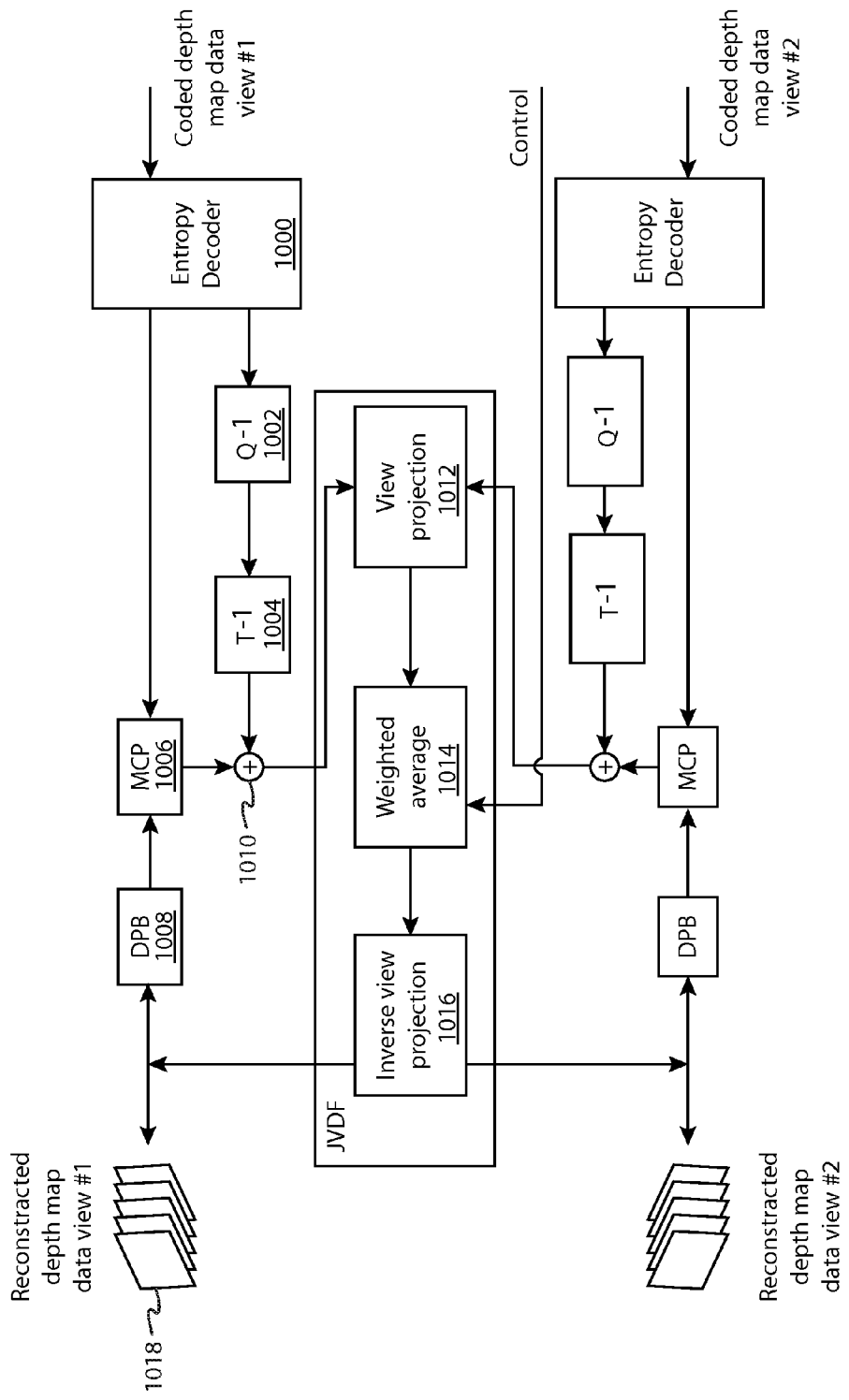
FIG. 10 shows a schematic diagram of a decoder according to some embodiments of the invention.

Thus, FIG. 10 shows the encoder as comprising similar depth map decoders for both View1 and View2. The decoder shows an entropy decoder 1000 for performing an entropy decoding on the received signal. A dequantizer 1002 may dequantize the transform coefficients which are among the output of the entropy decoder and the inverse transform block 1004 may perform an inverse transform operation to the dequantized signal output by the dequantizer. The output of the entropy decoder may also indicate that prediction error signal is not to be applied and in this case the prediction error decoder (1002, 1004) produces an all zero output signal.

The motion compensation unit 1006 receives the output of the entropy decoder as well. Based on the outputs of the entropy decoder and the decoded picture buffer 1008 (which may alternatively or in addition be a reference picture buffer), the motion compensation unit determines whether an intra-prediction, an inter-prediction, or interpolation operation is to be carried out. The output of the motion compensation unit is combined, by a summing device 1010, with the reconstructed prediction error signal received from the inverse transform block 1004 to generate a preliminary reconstructed depth image. The summing device may operate on block basis.

The preliminary reconstructed depth image may be projected into any selected viewpoint or camera position by the view projection unit 1012. The preliminary reconstructed depth image of View2 may also be projected to the same selected viewpoint or camera position by the view projection unit 1012.

Similarly as in the encoding phase, the filtering is carried out according to the joint multi-view depth filtering (JVDF) process as described above. Thus, the first preliminary reconstructed depth picture representing View1 of a multiple camera view representation and a second preliminary reconstructed depth picture representing View2 are provided in a view projection unit 1012, wherein the first preliminary reconstructed depth picture is projected onto a first projected depth picture representing a selected view. If the selected view differs from View2, then the second preliminary reconstructed depth picture is projected onto a second projected depth picture representing the selected view. Otherwise, if the selected view is the same as View2, a second projected depth picture is considered to be identical to the second preliminary reconstructed depth picture in the filtering operation. The filtering unit 1014 is provided with at least one filter parameter, which may be obtained from the side information of the received bitstream. The at least one filter parameter may be provided by the entropy decoder 1000.

The first projected depth picture and the second projected depth picture are filtered jointly by the filtering unit using the at least one filter parameter into a filtered depth picture, preferably using the weighted average filtering as described above may be used. In a inverse view projection unit 1016, at least a part of the filtered depth picture are projected onto a first back-projected depth picture representing View1 and the first converted depth picture 1018 is formed by replacing at least a part of pixel values of the first preliminary reconstructed depth picture with the first back-projected depth picture. The first converted depth picture 1018 may also be stored in the decoded picture buffer 1008 to be further utilized in the motion compensation process and other prediction processes. If the selected view for projection differs from View2, at least a part of the filtered depth picture are projected onto a second back-projected depth picture representing View2 and the second converted depth picture is formed by replacing at least a part of pixel values of the second preliminary reconstructed depth picture with the second back-projected depth picture. The second converted depth picture may also be stored in the decoded picture buffer to be further utilized in the motion compensation process and other prediction processes.

While the encoding operation in FIG. 9 and the decoding operation in FIG. 10 were described mostly on picture basis, many processing blocks may operate on smaller units, such as block of pixels or rows of pixel blocks, at a time. For example, the view projection, joint filtering, and inverse view projection may be performed for a row of pixel blocks at a time, such as for a 16-pixel-high set of pixel rows at a time. Different processing blocks may operate on different unit sizes. For example the transform and inverse transform blocks may operate on 8×8 pixel blocks at a time, while the view projection, joint filtering, and inverse view projection may be performed for a row of pixel blocks at a time.

While the encoding block diagram in FIG. 9 and the decoding block diagram in FIG. 10 included two loops, one for each view, it is not to be understood that an implementation could not use the same blocks for processing of more than one view. Moreover, the same blocks may be used for both texture and depth encoding and/or decoding.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Many of the embodiments of the invention described above included a view synthesis or DIBR operation as part of the decoder apparatus. However, it would be appreciated that the view synthesis or DIBR operation may be coupled with an apparatus separate from the decoder apparatus, such as a rendering apparatus connected with the decoder apparatus with a fixed connection such as a High-Definition Multimedia Interface (HDMI) cable and connectors or a wireless connection such as a wireless local area network connection. Likewise, the joint multiview depth filtering (JVDF) may be performed in a separate apparatus from the decoder apparatus, particularly when JVDF is realized as post-processing (i.e. not done in the decoding loop).

Many of the embodiments of the invention described above included a depth estimation or derivation operation as part of the encoder apparatus. However, it would be appreciated that the depth estimation or derivation may be coupled with an apparatus separate from the encoder apparatus, such as a capturing apparatus connected with the encoder apparatus with a fixed connection such as a High-Definition Multimedia Interface (HDMI) cable and connectors or a wireless connection such as a wireless local area network connection. Likewise, the joint multiview depth filtering (JVDF) may be performed in a separate apparatus from the encoder apparatus, particularly when JVDF is realized as pre-processing (i.e. not done in the encoding loop).

Figure 11:
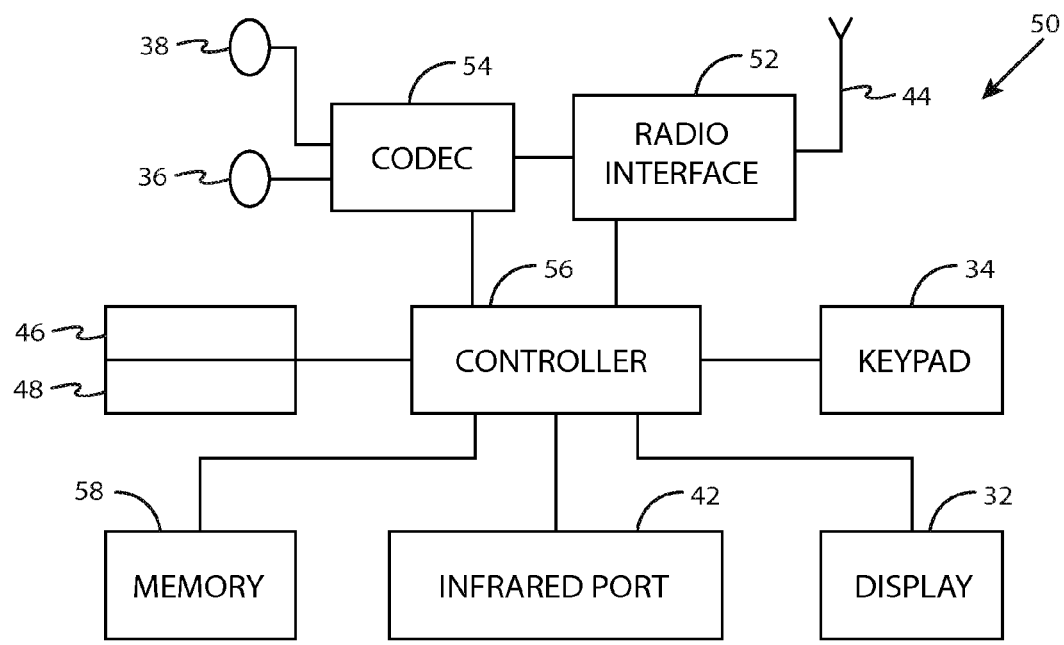
FIG. 11 shows schematically an electronic device suitable for employing some embodiments of the invention.
Figure 12:
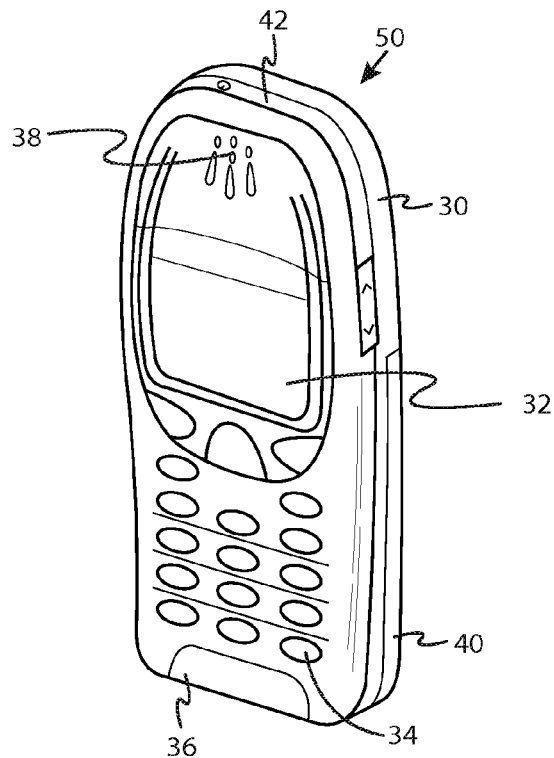
FIG. 12 shows schematically a user equipment suitable for employing some embodiments of the invention.

The following describes in further detail suitable apparatus and possible mechanisms for implementing the embodiments of the invention. In this regard reference is first made to FIG. 11 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In other embodiments of the invention, the apparatus may receive the video image data for processing from another device prior to transmission and/or storage. In other embodiments of the invention, the apparatus 50 may receive either wirelessly or by a wired connection the image for coding/decoding.

Figure 13:
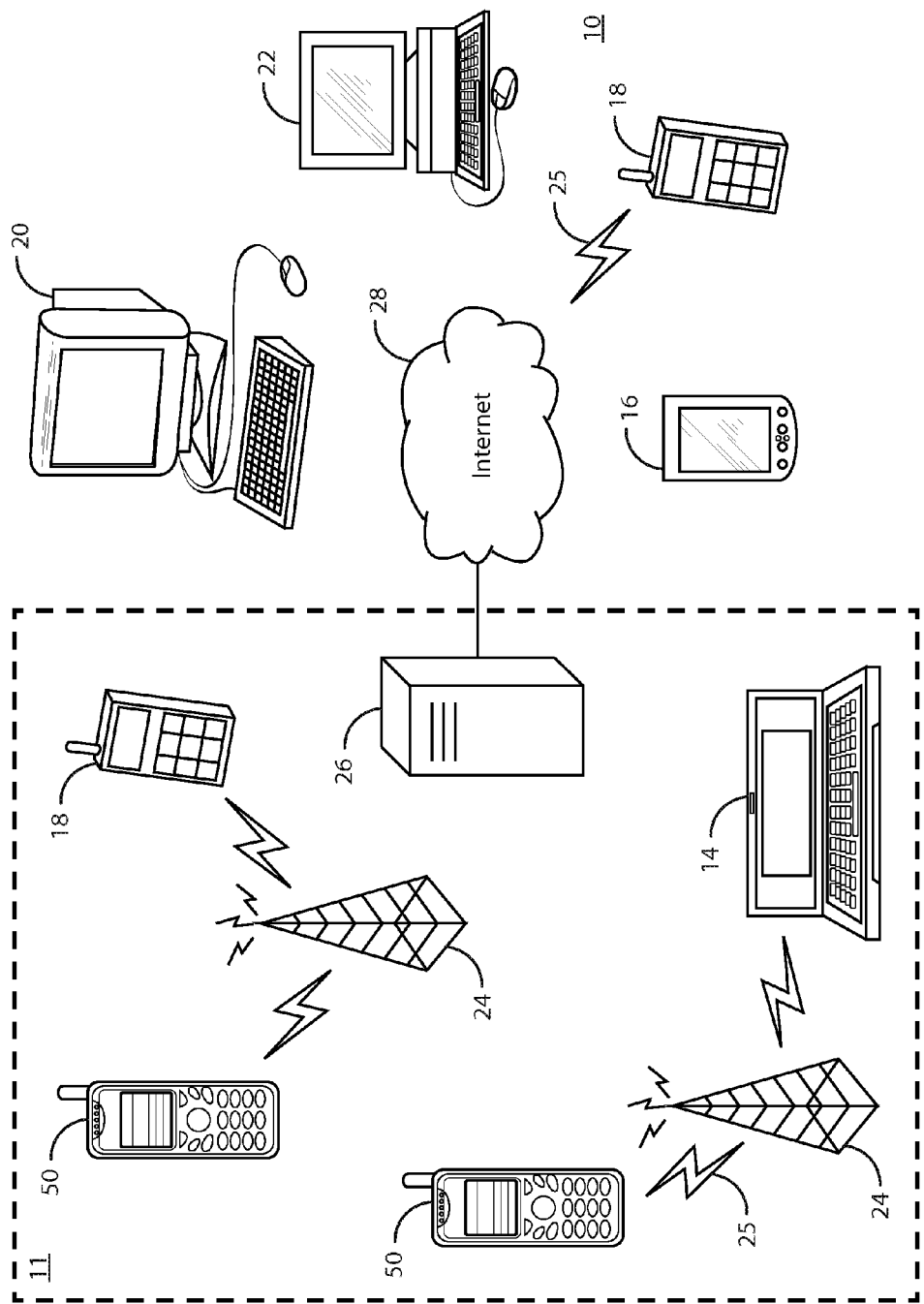
FIG. 13 further shows schematically electronic devices employing embodiments of the invention connected using wireless and wired network connections.

With respect to FIG. 13, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 13 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising:
    a video encoder configured for encoding multiple camera view representations, wherein said video encoder is further configured for
    obtaining a first depth picture representing a first view;
    projecting the first depth picture representing the first view of a multiple camera view representation onto a first projected depth picture representing a second view;
    obtaining a second depth picture representing the second view;
    obtaining at least one filter parameter;
    filtering the first projected depth picture and the second depth picture jointly using the at least one filter parameter into a filtered depth picture;
    projecting at least a part of the filtered depth picture onto a first back-projected depth picture representing the first view; and
    forming a first converted depth picture by replacing at least a part of pixel values of the first depth picture with the first back-projected depth picture.

2. The apparatus according to claim 1, wherein obtaining the second depth picture representing the second view further comprises
    receiving the second depth picture representing the second view or projecting a third depth picture representing a third view onto the second depth picture representing the second view.

3. The apparatus according to claim 1, wherein the video encoder is further configured for
    receiving a first texture picture representing the first view;
    synthesizing a second texture picture on the basis of the converted depth picture and the first texture picture.

4. The apparatus according to claim 1, wherein the video encoder is further configured for:
    receiving a first depth picture;
    encoding the first depth picture into a first coded depth picture to be included in a bitstream;
    deriving the first depth picture on the basis of said encoding or said first coded depth picture.

5. The apparatus according to claim 1, wherein the video encoder is further configured for:
    encoding a second input depth picture to a second coded depth picture to be included in the bitstream; and
    in said encoding of the second input depth picture, using the first converted depth picture as reference for prediction.

6. The apparatus according to claim 1, wherein the video encoder is further configured for:
    including the at least one filter parameter in the bitstream.

7. A method comprising:
    obtaining a first depth picture representing a first view;
    projecting the first depth picture representing the first view of a multiple camera view representation onto a first projected depth picture representing a second view;
    obtaining a second depth picture representing the second view;
    obtaining at least one filter parameter;
    filtering the first projected depth picture and the second depth picture jointly using the at least one filter parameter into a filtered depth picture;
    projecting at least a part of the filtered depth picture onto a first back-projected depth picture representing the first view; and
    forming a first converted depth picture by replacing at least a part of pixel values of the first depth picture with the first back-projected depth picture.

8. The method according to claim 7, wherein obtaining a second depth picture representing the second view further comprises
    receiving the second depth picture representing the second view or projecting a third depth picture representing a third view onto the second depth picture representing the second view.

9. The method according to claim 7, further comprising
    receiving a first texture picture representing the first view;
    synthesizing a second texture picture on the basis of the converted depth picture and the first texture picture.

10. The method according to claim 7, wherein the method is carried out in a decoder, the method further comprising
    receiving a bitstream; and
    deriving the at least one filter parameter from the bitstream.

11. The method according to claim 10, further comprising
    decoding a first coded first depth picture from the bitstream into a first depth picture;
    decoding a second coded depth picture from the bitstream; and
    in said decoding of the second coded depth picture, using the first converted depth picture as reference for prediction.

12. The method according to claim 7, wherein the method is carried out in an encoder, the method further comprising
encoding the first converted depth picture into a bitstream.

13. The method according to claim 12, further comprising
receiving a first depth picture;
encoding the first depth picture into a first coded depth picture to be included in a bitstream;
deriving the first depth picture on the basis of said encoding or said first coded depth picture.

14. The method according to claim 12, further comprising
encoding a second input depth picture to a second coded depth picture to be included in the bitstream; and
in said encoding of the second input depth picture, using the first converted depth picture as reference for prediction.

15. The method according to claim 12, further comprising including the at least one filter parameter in the bitstream.

16. A non-transitory computer readable storage medium stored with code thereon for use by an apparatus, which when executed by a processor, causes the apparatus to perform:
obtaining a first depth picture representing a first view;
project the first depth picture representing the first view of a multiple camera view representation onto a first projected depth picture representing a second view;
obtain a second depth picture representing the second view;
obtain at least one filter parameter;
filter the first projected depth picture and the second depth picture jointly using the at least one filter parameter into a filtered depth picture;
project at least a part of the filtered depth picture onto a first back-projected depth picture representing the first view; and
form a first converted depth picture by replacing at least a part of pixel values of the first depth picture with the first back-projected depth picture.

17. At least one processor and at least one memory, said at least one memory stored with code thereon, which when executed by said at least one processor, causes an apparatus to perform:
obtaining a first depth picture representing a first view;
projecting the first depth picture representing the first view of a multiple camera view representation onto a first projected depth picture representing a second view;
obtaining a second depth picture representing the second view;
obtaining at least one filter parameter;
filtering the first projected depth picture and the second depth picture jointly using the at least one filter parameter into a filtered depth picture;
projecting at least a part of the filtered depth picture onto a first back-projected depth picture representing the first view; and
forming a first converted depth picture by replacing at least a part of pixel values of the first depth picture with the first back-projected depth picture.

18. An apparatus comprising:
a video decoder configured for decoding multiple camera view representations, wherein said video decoder is further configured for
obtaining a first depth picture representing a first view;
projecting the first depth picture representing the first view of a multiple camera view representation onto a first projected depth picture representing a second view;
obtaining a second depth picture representing the second view;
obtaining at least one filter parameter;
filtering the first projected depth picture and the second depth picture jointly using the at least one filter parameter into a filtered depth picture;
projecting at least a part of the filtered depth picture onto a first back-projected depth picture representing the first view; and
forming a first converted depth picture by replacing at least a part of pixel values of the first depth picture with the first back-projected depth picture.

19. The apparatus according to claim 18, wherein obtaining a second depth picture representing the second view further comprises
receiving the second depth picture representing the second view or projecting a third depth picture representing a third view onto the second depth picture representing the second view.

20. The apparatus according to claim 18, wherein the video decoder is further configured for
receiving a first texture picture representing the first view; and
synthesizing a second texture picture on the basis of the converted depth picture and the first texture picture.

21. The apparatus according to claim 18, wherein the video decoder is further configured for
receiving a bitstream; and
deriving the at least one filter parameter from the bitstream.

22. The apparatus according to claim 18, wherein the video decoder is further configured for
decoding a first coded first depth picture from the bitstream into a first depth picture;
decoding a second coded depth picture from the bitstream; and
in said decoding of the second coded depth picture, using the first converted depth picture as reference for prediction.

23. A video encoder configured for encoding multiple camera view representations, wherein said video encoder is further configured for
obtaining a first depth picture representing a first view;
projecting the first depth picture representing the first view of a multiple camera view representation onto a first projected depth picture representing a second view;
obtaining a second depth picture representing the second view;
obtaining at least one filter parameter;
filtering the first projected depth picture and the second depth picture jointly using the at least one filter parameter into a filtered depth picture;
projecting at least a part of the filtered depth picture onto a first back-projected depth picture representing the first view; and
forming a first converted depth picture by replacing at least a part of pixel values of the first depth picture with the first back-projected depth picture.

24. A video decoder configured for decoding multiple camera view representations, wherein said video decoder is further configured for
obtaining a first depth picture representing a first view;
projecting the first depth picture representing the first view of a multiple camera view representation onto a first projected depth picture representing a second view;
obtaining a second depth picture representing the second view;
obtaining at least one filter parameter;

filtering the first projected depth picture and the second depth picture jointly using the at least one filter parameter into a filtered depth picture;

projecting at least a part of the filtered depth picture onto a first back-projected depth picture representing the first view; and forming a first converted depth picture by replacing at least a part of pixel values of the first depth picture with the first back-projected depth picture.

* * * * *